United States Patent [19]

Aitkenhead et al.

[11] Patent Number: 5,493,695
[45] Date of Patent: Feb. 20, 1996

[54] TRUNKING RADIO SYSTEM WITH FREQUENCY DIVERSITY

[76] Inventors: Gary Aitkenhead, 17 Wickham Cl, Tadley, Basingstoke, Hants RG266JT; Nicholas W. Whinnett, 211A St Johns Hill, London SW111TH; Anthony P. Van Den Heuvel, Gunners Wood, Chertsey Road, Windlesham, Surrey GU206HZ, all of Great Britain

[21] Appl. No.: 79,713

[22] Filed: Jun. 18, 1993

[30] Foreign Application Priority Data

Jun. 20, 1992 [GB] United Kingdom ............ 9213209

[51] Int. Cl.⁶ .................................................. H04B 7/02
[52] U.S. Cl. .................... 455/54.1; 455/34.1; 455/34.2; 455/53.1; 455/54.2; 455/67.1; 455/101; 455/103
[58] Field of Search .............................. 455/34.1, 34.2, 455/33.1, 53.1, 54.1, 54.2, 56.1, 59, 67.1, 101, 103, 17; 370/95.1, 95.3, 104.1

[56] References Cited

U.S. PATENT DOCUMENTS

4,672,601 6/1987 Ablay .................................. 455/34.1
4,712,229 12/1987 Nakamura ........................... 455/54.2
5,058,199 10/1991 Grube .................................. 455/34.1

Primary Examiner—Reinhard J. Eisenzopf
Assistant Examiner—Doris To
Attorney, Agent, or Firm—Susan L. Lukasik

[57] ABSTRACT

This invention relates to a trunking radio system (FIG. 1) having a central station and at least one remote station for communication with the central station over a number of frequency-divided radio channels. The central station has a transmitter (10) for transmitting a number of signals to different remote units on different channels and a trunking controller (12) for allocating channels to different remote units. The trunking controller monitors the excess number of channels over the number of channels allocated to remote units. The central controller signals to a remote unit to allocate a channel to the remote unit when there is at least one excess channel. Signals received from the remote unit over the at least two channels are diversity combined (21). The remote unit has a receiver for receiving signalling from the central station and a diversity transmitter (34, 35, 39) responsive to the signalling for transmitting a signal over the at least two channels. The invention also relates to a central station and a remote unit per se.

15 Claims, 6 Drawing Sheets

TRUNKING RADIO SYSTEM WITH FREQUENCY DIVERSITY

FIELD OF THE INVENTION

This invention relates to a trunking radio system comprising a central station and at least one remote station for communication with the central station over a plurality of frequency-divided radio channels. The invention also relates to a central station and a remote unit per se.

BACKGROUND OF THE INVENTION

Diversity is a well know method for providing improved system gain in radio applications involving multipath fading, such as land mobile radio applications. Frequency diversity is one type of diversity improvement in which the same information is transmitted on two or more RF (Radio Frequency) channels, separated far enough in frequency such that the fading is uncorrelated. For current typical land mobile radio systems, approximately 100 kHz or more of separation is needed. The system gain which can be obtained in this way depends on the degree to which the received signals are uncorrelated and the method of combining used. Details of such arrangements are extensively documented in a number of well know texts, including "Microwave Mobile Communications" by W. C. Jakes et al. Gain values of 6 dB to 8 dB are not uncommonly quoted for two-branch systems.

Frequency diversity is advantageous over the alternatives of time or space diversity, in not contributing to increased signal delay (a disadvantage in voice systems) or requiring the installation of extra, physically well separated antennas. The latter can be a problem from several viewpoints including the growing reluctance to disturb the environment and, at lower RF frequencies, the need for spacing dimensions which are incompatible with towers or even building installations.

However, frequency diversity itself has the disadvantage of requiring extra frequency assignment—difficult in spectrally congested markets—and duplication of the transmitter portion of the radio in today's FM radios which use class C amplifiers.

There is a need for improved quality of communication in trunking radio systems within the constraint of limited frequency assignment.

SUMMARY OF THE INVENTION

According to the present invention, a trunking radio system is provided comprising a central station and at least one remote unit for communication with the central station over a plurality of frequency-divided radio channels. The central station comprises: a transmitter for transmitting a plurality of signals to different remote units on different channels; a trunking controller for allocating channels to different remote units, said trunking controller having traffic monitoring means for monitoring the excess number of channels over the number of remote units having channels allocated; signalling means for signalling to a remote unit to allocate a channel to the remote unit, said signalling means being responsive to the traffic monitoring means to signal to a remote unit to allocate at least two channels to that remote unit when there is at least one excess channel and diversity means responsive to the traffic monitoring means, for receiving signals from the remote unit over said at least two channels. The remote unit comprises: a receiver for receiving signalling from the central station and diversity transmitting means responsive to said signalling for transmitting a signal over said at least two channels.

The invention solves the problem of lack of frequencies by taking advantage of the use of trunking. Even in a congested system, there are likely to be significant periods when the system is not fully loaded. The invention takes advantage of excess channel capacity to implement diversity.

Upon request for a channel, the trunked system controller sends a data message to the remote units indicating the frequencies to be used to talk to the central station. Where there is idle channel capacity available to be assigned—i.e. the system is lightly loaded, more than one frequency is allocated. Should this not be the case, only one frequency is allocated for use by the remote unit.

A preferred embodiment of the invention will now be described, by way of example only, with reference to the drawings.

DETAILED DESCRIPTION OF THE PREFERRED EMBODIMENT

An example of an embodiment of the invention will be described in the context of a "SMARTNET" trunking system.

Trunking is a technique which allows a number of communications channels to be shared between a number of users. A trunking controller is typically associated with a number of base stations, with a base station transmitting and receiving on one frequency. Typically, the number of frequencies is equivalent to the number of base stations. In some systems, a frequency is provided by time division multiple access (TDMA) into different time slots, with different time slots representing different channels. Thus, the system may have different channels on a single frequency and/or different channels on different frequencies. One of these channels is reserved for use as a control channel. All remote units listen on the control channel and the trunking controller instructs the remote units how to operate by transmitting digital commands on the control channel. When a remote unit wishes to talk to another remote unit, it requests allocation of a traffic channel by sending a command to the controller using the control channel. The controller then instructs the remote units to re-tune to a free traffic channel for communication to receive. The controller contains a table of the available traffic channels along with a flag to indicate which of the channels is being used at any point in time.

When the remote units finish their conversation, the unit ending the conversation signals to the controller on the traffic channel. The controller then instructs both radios to return to the control channel using a command on the traffic channel. That traffic channel is then available for the controller to assign to another remote unit or group of remote units.

Figure 1:
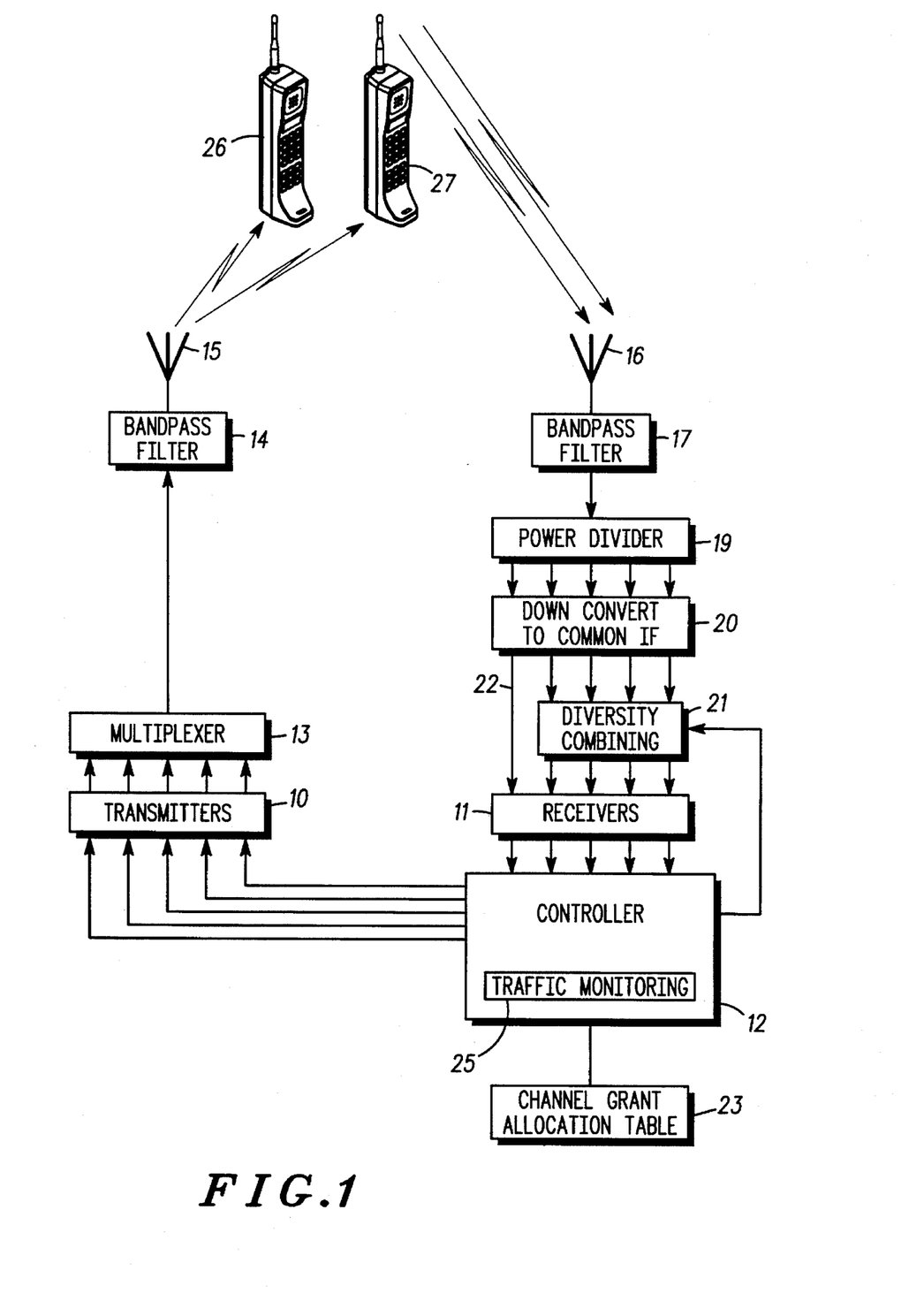
FIG. 1 shows a block diagram of a central station in accordance with the preferred embodiment of the invention.

An example of a central station in accordance with the preferred embodiment of the invention is shown in FIG. 1. The central station comprises a number of transmitters (base stations) 10 and a number of receivers 11. Typically one transmitter and one receiver will be co-located in the same base station unit. The transmitters 10 and receiver 11 are connected to a trunking controller 12 having traffic monitoring means 25. The outputs of the transmitters are connected via a multiplexer 13 and a bandpass filter 14 to a transmit antenna 15. A receive antenna 16 is provided connected to a bandpass filter 17 and a power divider 19. Down converters 20 connect each of a number of outputs from the power divider 19 to a diversity combiner 21 and, in the case of the control channel 22, directly to one of the receivers 11.

In the examples shown, there are five frequency-divided radio channels. One of these is a control channel. The other four are traffic channels. In the example, there is no TDMA division of the channels, and one frequency supports only one channel. In a system, the channels are typically divided at 12.5 or 25 kHz spacings. The four traffic channels supported by the central station of FIG. 1 will generally not be adjacent channels, in which case they will extend over more than 100 kHz.

The operation of the central station is as follows. When a remote unit (26 or 27) wishes to make a call, it transmits a request for channel grant command to the central station on the control channel. This command is received through antenna 16, amplified and fed to the down-converters 20. From down-converters 20, the control channel is filtered and passed to the corresponding receiver 11. The trunking controller 12 receives the request command and performs a look-up operation in its table of channel grants 23 to determine whether there is a free channel. Assuming that there is a free channel, the controller 12 generates a "go to channel" command and transmits this on the control channel through one of the transmitters 10, from where it is output via the multiplexer 13 and the filter 14 and transmitted from the antenna 15.

In the event that the traffic monitoring means 25 of the controller 12 determines that there is more than one channel available for allocation, it takes advantage of the low traffic situation by allocating two (or indeed more) channels to the requesting remote unit e.g., unit 26. This is achieved by transmitting a modified "go to channel" command.

On receipt of the modified "go to channel" command, the remote unit 26 commences two-way communication on the two (or more) allocated traffic channels. The same signal (voice) is modulated on the two channels and received at the antenna 16. Upon down-conversion in down-converter 20, the two traffic channels are diversity combined in combiner 21. The combining is performed under control of the controller 12, which controls the combiner to perform the diversity combining on the appropriate two channels that have been allocated. The combining operation can be a simple selection of the stronger of the two received signals, but it is preferably a maximal ratio combining function, as is known in the art and described in the aforementioned book of W. C. Jakes, pages 319–321.

Outbound traffic (which may originate from a dispatcher or other source not shown, or may be a retransmission of inbound traffic) is transmitted on the same two channels. It is mentioned for completeness at this point that a "channel" comprises a pair of frequencies, one assigned to inbound traffic and the other to outbound traffic.

Because the frequencies of the channels are separated by more than 100 kHz, fading on the two channels is substantially uncorrelated and the signal-to-noise ratio of the received signal is improved by more than 3 dB.

It will, of course, be appreciated that the traffic channels can be separated by more than 100 kHz, subject to the limitations of the frequency band allocated to the overall system. in the event that the traffic channel are separated by less than 100 kHz, the system chooses, where possible, to allocate the most remotely separated channels for diversity combining.

The remote unit 26 with which the central station of FIG. 1 communicates is capable of receiving a signal on two channels and diversity combining those channels and it is capable of transmitting a signal on two channels, for combining at the central station as disclosed above. Transmission on two channels is made possible through the use of a linearized power amplifer using well-known linearizing techniques such as feed forward, described in the paper "Feedforward—an alternative approach to amplifier linearisation" Radio and Electronic Engineer, Vol 44 No. 5 May 1974 T. J. Bennett, R. F. Clements, or pre-distortion or cartesian feedback described in the paper "Linear transceiver architectures" A. Bateman, D. M. Haines, R. J. Wilkinson 38th IEEE Vehicular Technology Conference (15–17 June 1988) p. 478–84, 1988.

Feedforward is well known as a wideband linearizing technique as required by this application. The bandwidth of predistortion and cartesian feedback is dependant on the pressing power required for the signal processing, and so although mainly used presently for narrowband applications, it is merely a matter of sufficient processing power to use the technique in wide bandwidth application.

Figure 2:
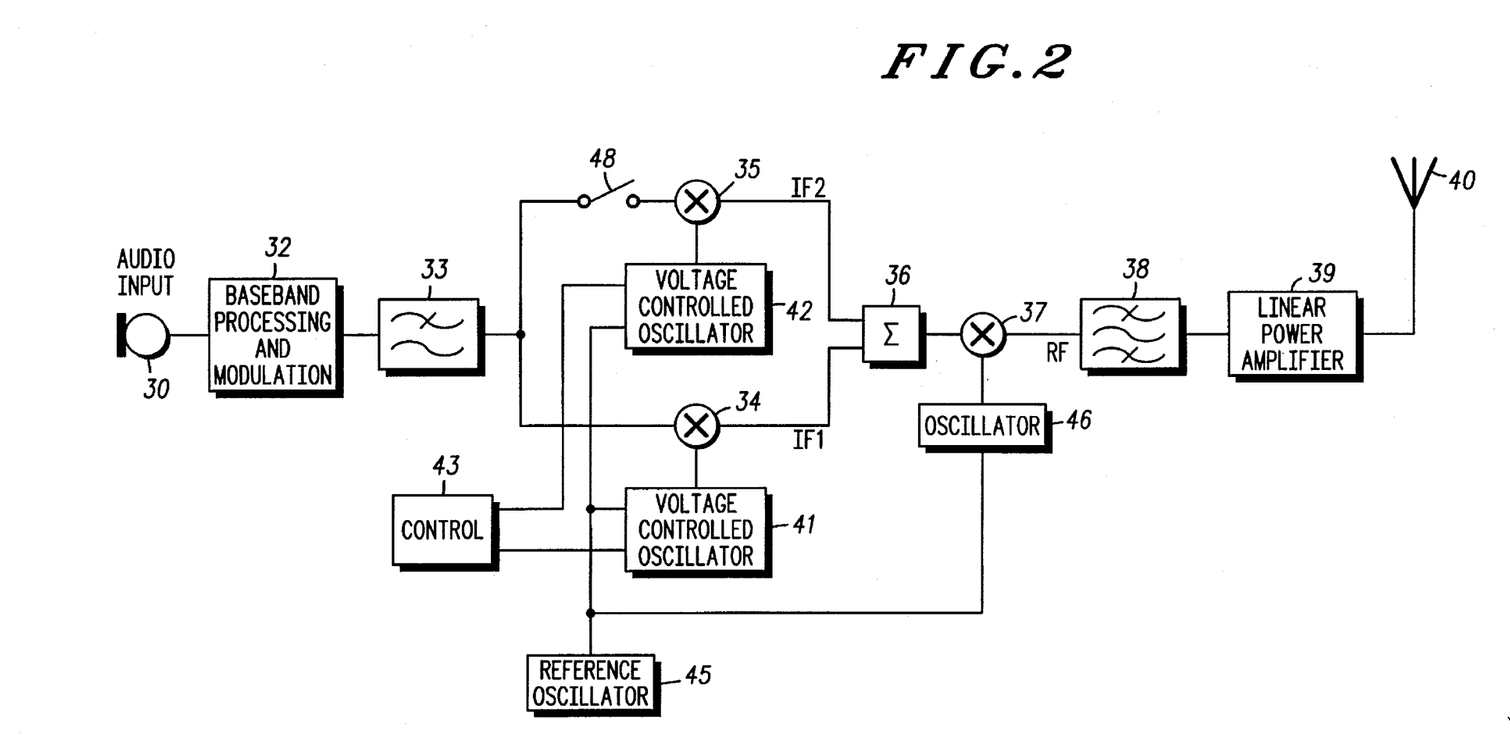
FIG. 2 shows a block diagram of the transmitter part of the remote unit in accordance with the preferred embodiment of the invention.

The transmitter circuitry of the remote unit 26 or 27 is shown in FIG. 2. Referring to FIG. 2, there is shown an audio input (a microphone) 30, base-band processing and modulation circuitry 32, low pass filter 33, first and second IF (intermuediate frequency) mixers 34 and 35, a summer circuit 36, and RF carrier mixer 37, a RF band-pass filter 38, a linear power amplifier 39 and a transmit antenna 40. Connected to the first and second mixers 34 and 35 are first and second voltage controlled oscillators (VCOs) 41 and 42, which are under the control of a controller 43. The first and second oscillators 41 and 42 are connected to a reference oscillator 45, which is also connected to an RF carrier oscillator 46 which is connected to the RF carrier mixer 37.

The path between the base band processing and modulation circuitry 32 and the RF carrier mixer 37 via the second mixer 35 is labelled IF2 and includes a switch 48, which is under the control of the controller 43. The other path labelled IF1 through the mixer 34 does not include any corresponding switch.

The operation of the circuit is a follows. Initially, the VCO 41 is tuned such that, when mixed up to the transmission frequency, this channel is tuned to the control channel. When tuned to the control channel, the base-band processing and modulation circuitry 32 generates a "request for channel grant" command, which is transmitted through the antenna 40. This command is received by the central station as described above and a "go to channel" command is transmitted to the remote unit and received by the controller 43. When there is sufficient channel capacity, this command allocates two traffic channels to the remote unit. The controller 43 tunes the VCOs 41 and 42 to correspond to these two channels and closes the switch 48. These channels will be at least 100 kHz apart. The remote unit is now set for communication.

The user speaks into the microphone 30. The speech may be digitized and coded in base-band processing and modulation circuitry 32, or may simply be modulated as an analog signal in circuitry 32. The modulated speech is passed to the two mixers 34 and 35, where it is up-converted to the intermediate frequencies IF1 and IF2. These frequencies are summed in summer 36 and mixed to their respective channel frequencies. These frequencies are passed through the broadband band-pass filter 38 and amplified by the broadband linear power amplifier 39. Both frequencies are transmitted through the antenna 40.

Figure 3:
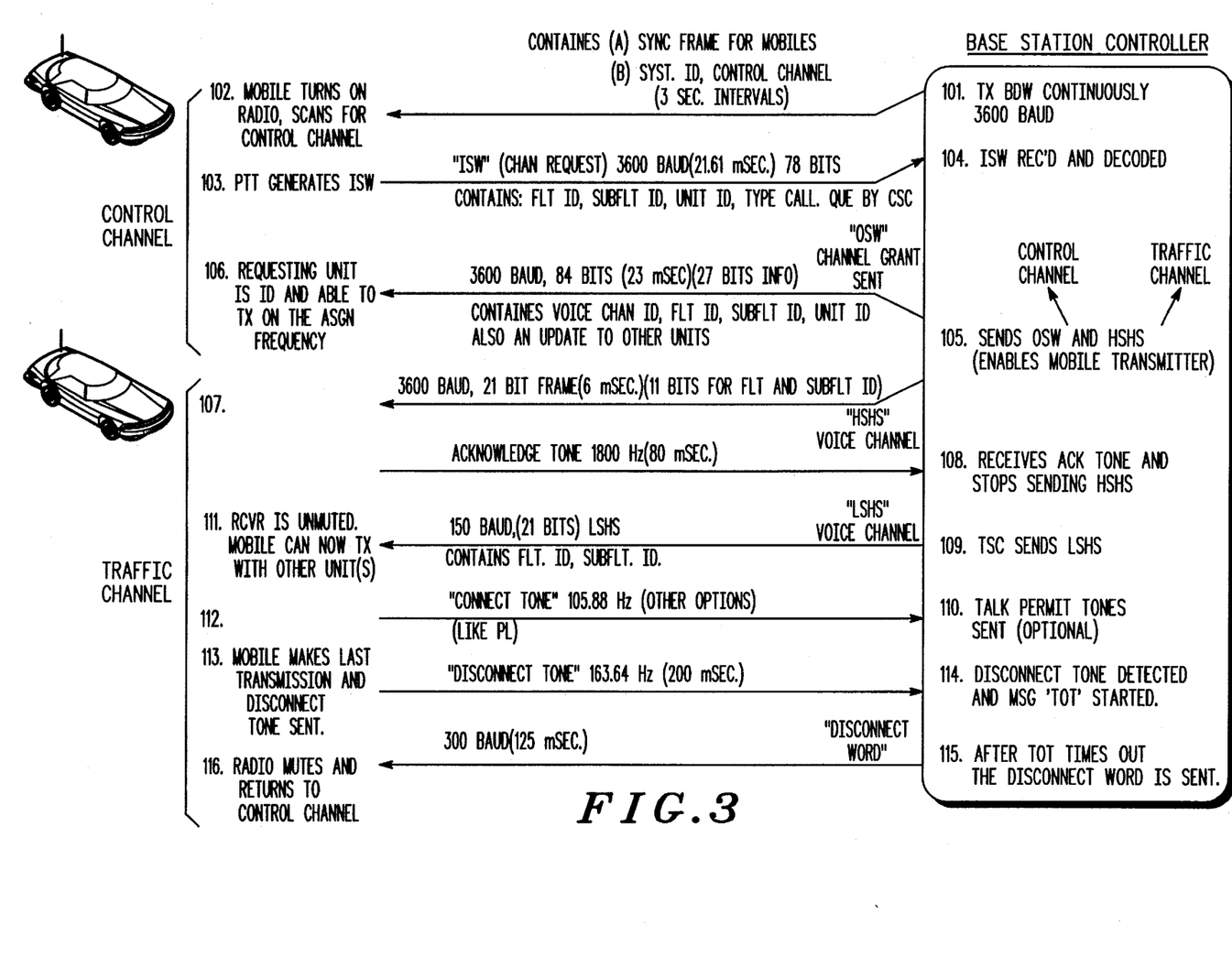
FIG. 3 shows an exchange of commands between the central station and the remote unit in accordance with the preferred embodiment.

Referring now to FIG. 3, details of the exchange of commands leading to set-up of the two channels as shown. On the left hand side are shown the actions of the remote unit 26 or 27 (the "mobile"). On the right hand side are shown the actions of the trunking controller 12.

The following abbreviations are used:

BDW—Background Data Word

HSHS—High Speed Hand Shake

ISW—Inbound Signalling Word

LSHS—Low Speed Hand Shake

OSW—Outbound Signalling Word

Sequential sets of operations are numbered 101–106.

The trunking controller 12 continuously transmits the BDW at 3600 baud. This contains (a) the synchronization frame for the mobile and (b) the system identification and frequency of the control channel. This is transmitted at 3-second intervals. When the mobile initially turns on, it scans for the control channel and locates the control channel. When the mobile wishes to transmit, its operator presses its push-to-talk (PTT). This causes an ISW to be generated and transmitted (step 103). The ISW contains the fleet identification, sub fleet identification, unit identification, type call and other information. In step 104, the trunking controller 12 receives the ISW and decodes it.

In step 105, the trunking controller sends an OSW and HSHS, containing, respectively, the control channel and traffic channel information. This has the effect of enabling the mobile transmitter. The OSW comprises 84 bits and contains the voice channel ID (identification), the fleet ID, the sub fleet ID and the unit ID and provides an update to other units. In step 106, the mobile receives the OSW, identifies its own ID and is thus able to transmit on the assigned frequencies. In step 107, the mobile receives the HSHS on the voice channel. It acknowledges with an acknowledge tone at 1800 Hz. On receipt of this (step 108) the trunking controller stops sending the HSHS and sends the LSHS at 150 baud (step 109). On receipt of this at the mobile (step 111) the mobile receiver is unmuted and the mobile can now transmit, along with other units in the sub fleet. Communication carries on over the traffic channel until (step 113) the mobile makes its last transmission and a disconnect tone is sent at 163.64 Hz. This is received by the trunking controller (step 114) and after a time-out, a disconnect word is sent (step 115) at 300 baud. On receipt of this word, the mobile mutes and returns to the control channel.

The above is a general sequence of events in a "SMART-NET" system and the particular modification required for allocating of several traffic channels for diversity purposes is described with reference to FIG. 4. The first word shown in FIG. 4. contains the requesting unit ID of 16 bits and a 5-bit op-code. The second word comprises the talk group ID (12 bits) the requesting unit type (4 bits) and another 5-bit op-code. Beneath this prior art dual-word group call request is shown a dual-word group call request modified to accommodate the present invention for the allocation of two channels. The first word 200 is unchanged, but the second word 202 has a special op-code generated by the remote unit indicating that two channels can be used (if the remote unit wishes to use them).

Figure 5:
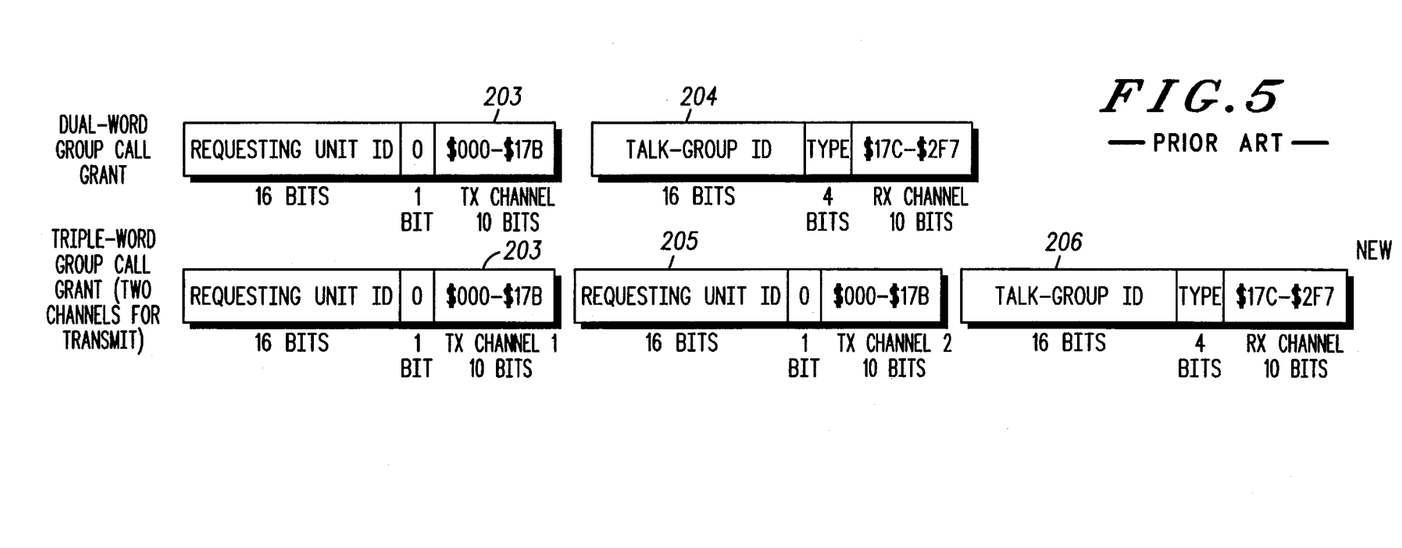
FIG. 5 shows the inbound and outbound signalling words in greater detail, in the case of implementation of the invention in a SMARTNET (trademark) based system.

Referring to FIG. 5, there is shown the OSW transmitted by the trunking controller in step 105 of FIG. 3. In the upper half of FIG. 5 there is shown a dual-word group call grant in accordance with the prior art, in which the first word 203 comprises: the ID of the requesting unit (16 bits); a further bit which need not be described and 10 bits identifying the transmit channel being granted. The second word of the "go to channel" command comprises the identification number of the talk group (that is to say the remote units that are to tune in unison to the same channel). It comprises a 4-bit type identifier, which need not be described, and it comprises 10 bits identifying the receive channel. The lower part of FIG. 5 shows a modified form of group call grant command in the form of a triple-word with the first word 203 being as described above and in which the second and third words 205, 206 identify respectively, an additional transmit channel and the receive channel. The second word of this triple-word command has the same structure as the first word 203, but identifies a different transmit channel, separated in frequency by at least 100 kHz from the first transmit channel. The third word 206 is the same as the second word 204 of the dual-word already described and shown in FIG. 5.

On receipt of the first word 203, the remote unit identifies the last 10 bits as being a transmit channel and stores this as transmit channel 1. On receipt of the second word, the remote unit again recognizes the last 10 bits as being in the range ($000–$17B) identifying another transmit channel. The remote unit stores this second value as a second transmit channel and expects a third word identifying a receive channel. The remote unit receives the third word 206 and identifies the first 10 bits as being in the range ($17C–$2F7) identifying a receive channel. It stores this value as the receive channel and concludes that this is the end of the group call grant command.

It should be noted that the arrangement is sufficiently flexible for a remote unit to indicate to the base unit that it has frequency diversity capacity (using group call request word 202) and can operate normally in the case where the base unit with which the remote unit is communicating does not have frequency diversity capability. In such a case, the base unit transmits a normal dual-word group call grant 203, 204 and no confusion arises at the mobile, because the second word 204 has its receive channel indicator in the range $17C–$2F7, so that the mobile recognises this as the second word of a dual-word, rather than the second word of a triple-word.

Figure 4:
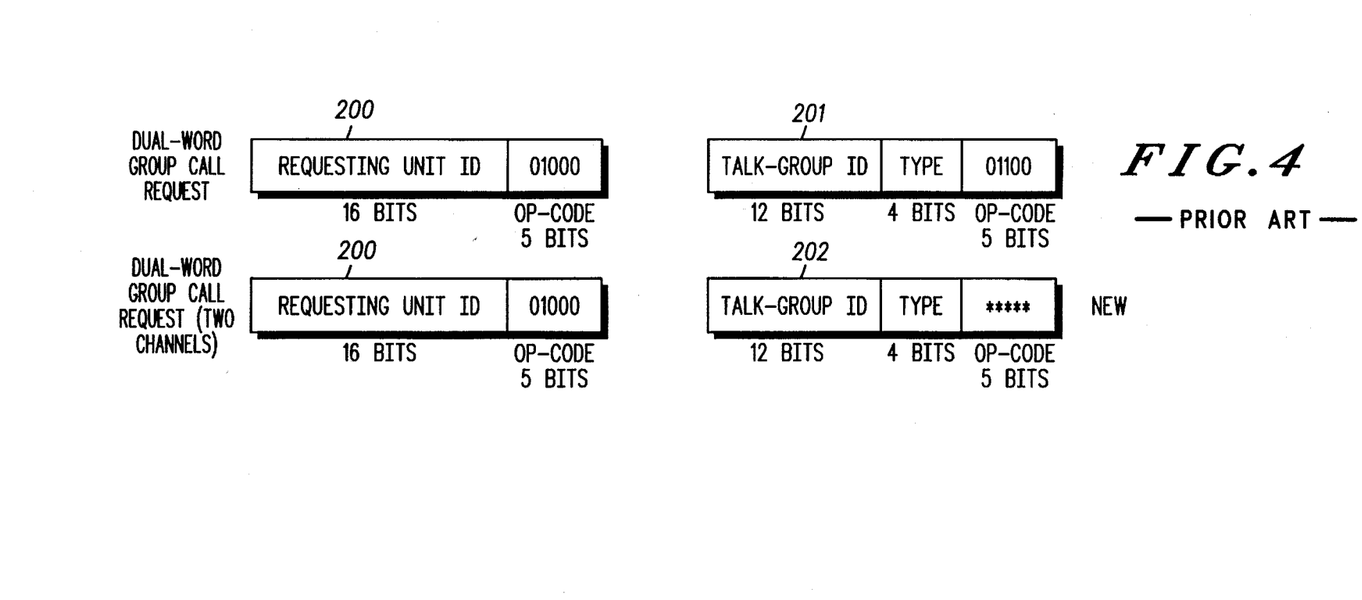
FIG. 4 shows the inbound and outbound commands exchanged by the units.
Figure 6:
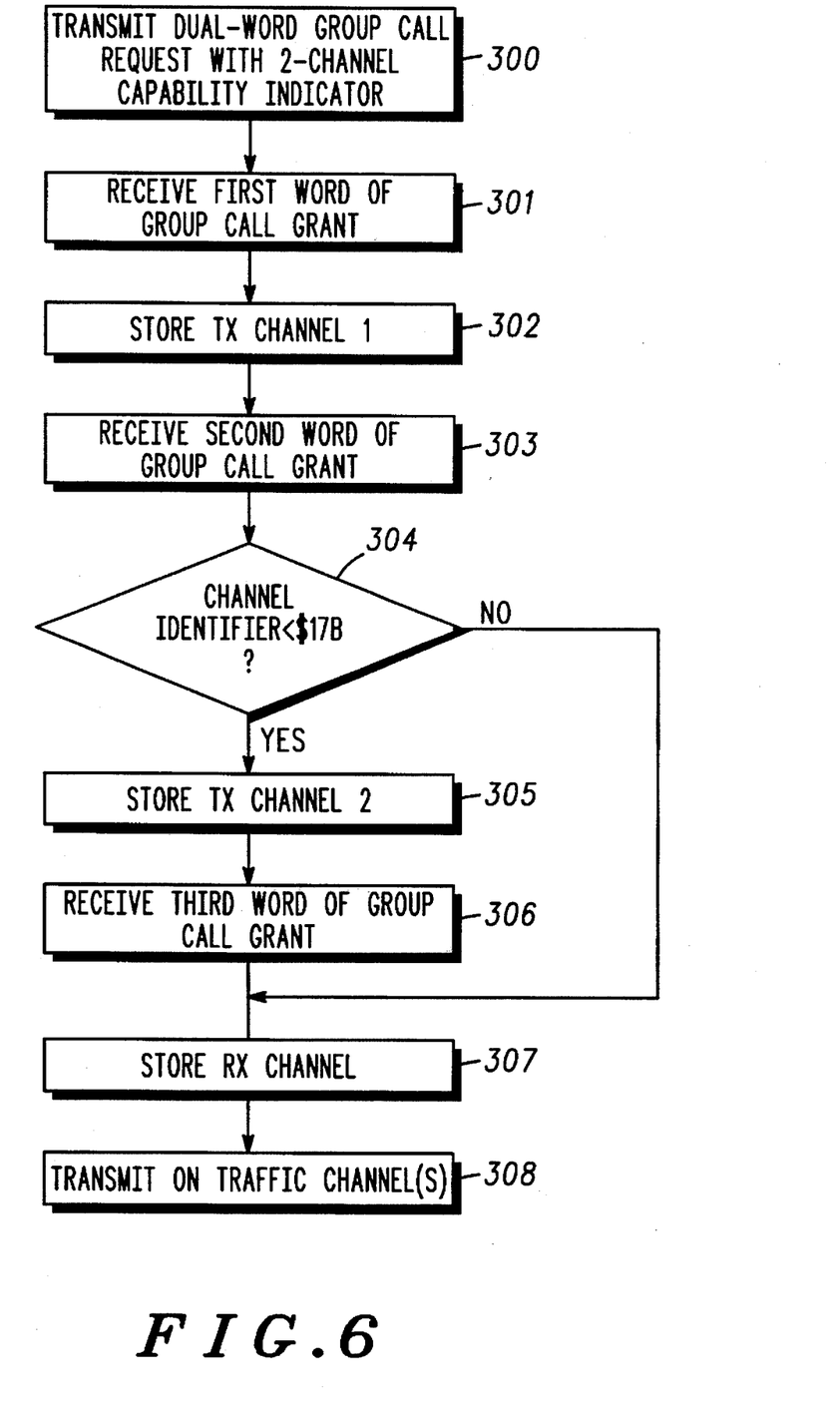
FIGS. 6 and 7 show steps of a channel grant procedure at the remote unit and central unit of FIGS. 2 and 1, respectively.
Figure 7:
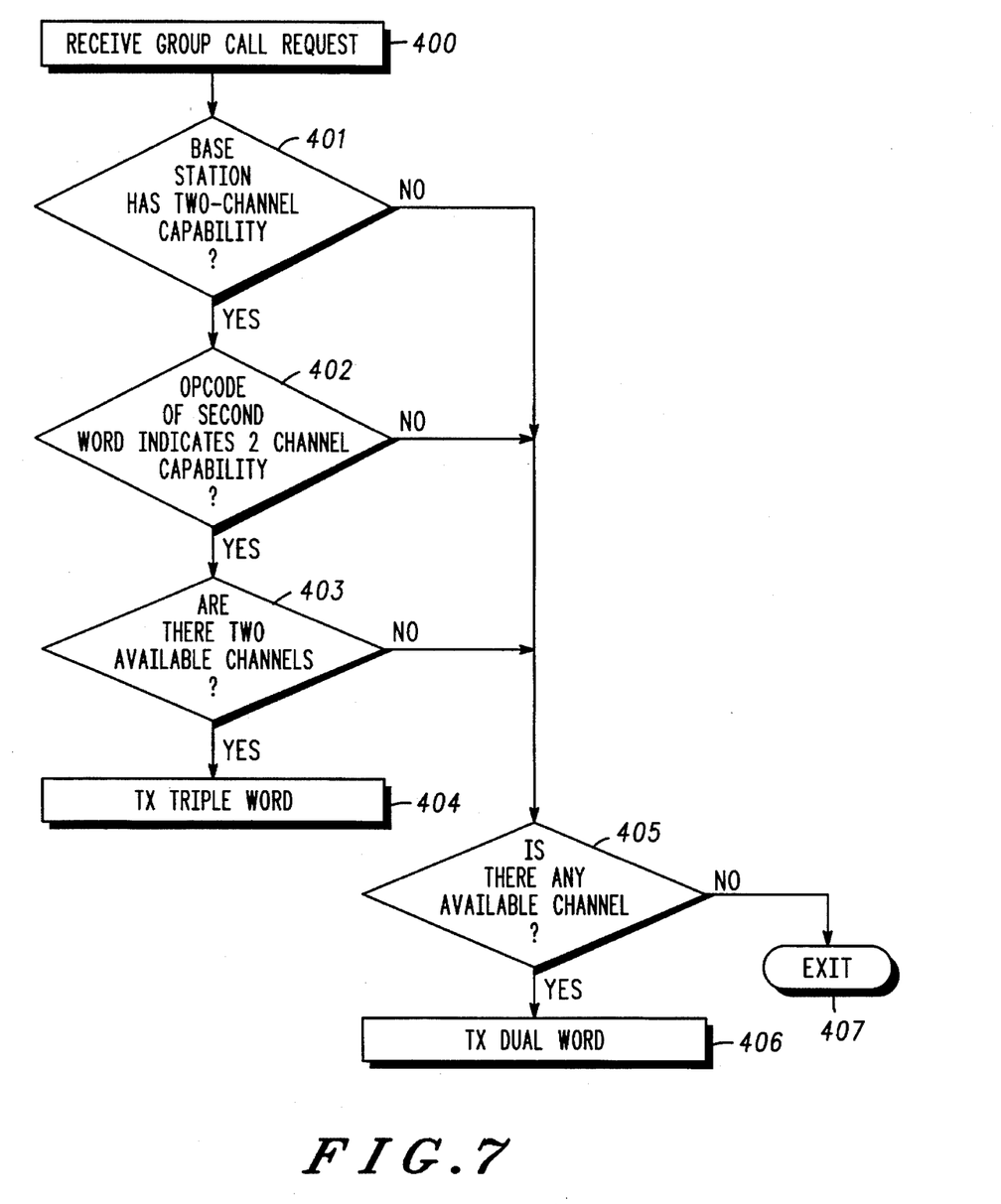

The operations carried out by the remote units 26, 27 and the base station during the exchange of the commands shown in FIGS. 4 and 5 are shown in FIG. 6 and 7. FIG. 6 shows the steps carried out in the remote unit, e.g., 26 and FIG. 7 shows the steps carried out in the base station. Referring to FIG. 6, the dual-word 200–202 is transmitted in step 300. In step 301, the remote unit begins to receive the group call grant command from the base station. In step 301, the remote unit receives the first word 203 of the dual or triple-word group call grant. The corresponding transmit channel indicator is stored in step 302. In step 303, the remote unit receives either the second word of a dual-word group call grant or the second word 205 of a triple-word grant command. In step 304, the 10-bit channel identifier is compared with the value representing the highest value of transmit channel (alternatively the comparison could be made with the lowest value of receive channel). If this indicates that the second word contains a transmit channel, this is stored in step 305 as a transmit channel. In step 306 the third word is received and in step 307, this is stored as a receive channel. In step 308, the remote unit commences transmission on the or each traffic transmit channel, and receives on the identified received channel.

Referring to FIG. 7, the steps carried out by the base station upon receipt of the dual-word group call request are shown. These steps are carried out between steps 300 and 301 of FIG. 6. The base station receives the group call request (step 400) and, if it has two-channel frequency diversity capability, it compares the op-code of the second word 202 of the dual-word group call request received from the remote unit (402). If this indicates that the remote unit has two-channel frequency diversity capability, the base station looks up its channel-grant allocation table 23 to determine whether there is more than one inbound channel available (403). If there is more than one inbound channel available the base station transmits a triple-word allocating two channels. If the result of any one of steps 401, 402 and 403 is "NO" the base station looks up its channel allocation table to see if there is at least one available channel. If there is, a dual-word is transmitted (step 406) allocating a single channel for communication. If there is no channel available, that is to say the system is fully loaded, the base station takes no further action (step 407) and the remote unit has to try again at a later time.

It will be appreciated that step 403, at which the base station determines whether or not to permit diversity, can be more complex. For example, if there is already another remote unit 27 communicating on two-channels, the base station can perform signal quality measurements to decide which of the various remote units should be allowed to use a particular spare channel. Similarly, if, in step 405, the base station determines that there is no available channel, yet there is another unit, e.g., 26, communicating on two-channels, the base station will cause that other unit 26 to release one of its channels, thereby making it available for the unit, e.g., 27 currently requesting access. It is particularly preferred that one or both of the central station and the remote unit (26 or 27) comprises a power amplifier with linearization means having a bandwidth of at least 100 kHz. The use of a linear transmitter permits the simultaneous amplification and transmission of the two or more signals without a need for complete duplication of the transmitter RF components.

We claim:

1. A trunking radio system comprising a central station and at least one remote unit for communication with the central station over a plural number of frequency-divided radio channels, wherein the central station comprises:

a transmitter for transmitting a plurality of signals to different remote units on different channels;

a trunking controller coupled to the transmitter for allocating channels to said different remote units and for signalling to a remote unit via the transmitter to access a channel, said trunking controller having traffic monitoring means for monitoring at a given time the number of channels allocated, said trunking controller being responsive to the traffic monitoring means to signal to the remote unit via the transmitter to access at least two channels when the number of channels allocated is less than the plural number of radio channels; and diversity means responsive to the traffic monitoring means, for receiving signals from the remote unit over said at least two channels; and the remote unit comprises:

a receiver for receiving signalling from the central station, and diversity transmitting means responsive to said signalling for transmitting a signal over said at least two channels.

2. In a trunking radio system comprising a central station and at least one remote unit for communication with the central station over a plural number of frequency-divided radio channels, the central station comprising:

a transmitter for transmitting a plurality of signals to different remote units on different channels;

a trunking controller for allocating channels to different remote units and for signalling to a remote unit via the transmitter to access a channel to the remote unit, said trunking controller having traffic monitoring means for monitoring at a given time the number of channels allocated;

said trunking controller being responsive to the traffic monitoring means to signal to the remote unit via the transmitter to access at least two channels when the number of channels allocated is less than the plural number of frequency-divided radio channels; and diversity means responsive to the traffic monitoring means, for receiving signals from the remote unit over said at least two channels.

3. A central station according to claim 2, wherein:

the trunking controller is arranged to signal to a first remote unit to access at least two channels;

means for receiving is provided coupled to the trunking controller, for receiving a request for a channel from a second remote unit;

the trunking controller is responsive to receipt of said request for the channel from said second remote unit and responsive to the traffic monitoring means for signalling to the first remote unit to cease accessing one channel of the at least two channels when there is no available channel, thereby creating a free channel and for signalling to the second remote unit to access the free channel.

4. A central station according to claim 2, wherein:

the trunking controller is arranged for signalling to a first remote unit to access at least two channels;

a receiver means is arranged for receiving a request from a second remote unit requesting allocation of more than one channel; and the trunking controller is responsive to the traffic monitoring means for deciding which of the first and second units is to use an excess channel, when the traffic monitoring means indicates that there are insufficient excess channels to satisfy the request from the second unit.

5. A central station according to claim 4, wherein the trunking controller is arranged to signal to the first remote unit to cease accessing one of said at least two channels, thereby creating an excess free channel and to the second remote unit to access the excess free channel and one other channel.

6. A central station according to claim 2, further comprising diversity transmitting means responsive to said traffic monitoring means of said trunking controller to transmit a signal to said remote unit via said transmitter on said at least two channels.

7. In a trunking radio system comprising a central station and at least one remote unit for communication with the central station over a plurality of frequency-divided radio channels, a remote unit comprising:

processing means for signalling to the central station a request for allocation of at least two channels for transmission, for receiving a channel grant command arranged as one of a first format and a second format, the first format containing one channel identifier and the second format containing two channel identifiers, and for decoding the channel grant command and determining in which of the two formats the command is arranged; and transmit means responsive to the processing means for transmitting on a single channel if the channel grant command contains only one channel identifier; and said transmitting means including a diversity transmitting means for transmitting the same signal on two channels if the channel grant command contains two channel identifiers.

8. A method of operating a trunking radio system having a central station and at least one remote unit for communication with the central station over a plural number of frequency-divided radio channels, the method comprising the steps of: at the central station:

transmitting a plurality of signals to different remote units on different channels;

allocating channels to said different remote units;

monitoring at a given time the number of channels allocated;

identifying that the number of channels allocated is less than the plural number of radio channels;

signalling to a remote unit to access at least two channels when the number of channels allocated is less than the plural number of radio channels;

receiving signals from the remote unit over said at least two channels; and diversity combining the signals received over the at least two channels; and at the remote unit:

receiving signalling from the central station to access at least two channels; and transmitting a signal over said at least two channels.

9. A method of operation of a central station of a trunking radio system having a central station and at least one remote unit for communication with the central station over a plural number of frequency-divided radio channels, the method comprising the steps of:

transmitting a plurality of signals to different remote units on different channels;

allocating channels to different remote units;

monitoring at a given time the number of channels allocated;

identifying when there is no available channel; and when there are at least two channels available:

signalling to a remote unit to access at least two channels;

receiving signals from the remote unit over said at least two channels; and diversity combining the signals received over the at least two channels.

10. A method according to claim 9, further comprising the steps of:

signalling to a first remote unit to access at least two channels;

receiving a request for a channel from a second remote unit;

signalling to the first remote unit to cease accessing one channel of the at least two channels when there is no available channel, thereby creating a free channel; and signalling to the second remote unit to access the free channel.

11. A method according to claim 9, further comprising the steps of:

signalling to a first remote unit to access at least two channels;

receiving a request from a second remote unit requesting allocation of more than one channel;

comparing relative qualities of signals received from the first and second units; and when the traffic monitoring means indicates that (i) the number of channels allocated is less than the plural number of radio channels and there is therefore an excess channel and (ii) there are insufficient excess channels to satisfy the request from the second unit, deciding, based on said comparing step, which of the first and second units is to use the excess channel.

12. A method according to claim 11, further comprising the steps of:

signalling to the first remote unit to cease accessing one of said at least two channels, thereby creating an excess free channel; and signalling to the second remote unit to access the excess free channel and one other channel.

13. In a trunking radio system having a central station and at least one remote unit for communication with the central station over a plurality of frequency-divided radio channels, a method of operation of a remote unit comprising the steps of:

signalling to the central station a request for allocation of at least two channels for transmission;

receiving a channel grant command arranged as one of first and second formats, the first format containing one channel identifier and the second format containing two channel identifiers;

decoding the channel grant command and determining in which of the two formats the command is arranged;

transmitting a signal intended for the central station on a single channel if the channel grant command contains only the one channel identifier; and transmitting the signal intended for the central station on two channels if the channel grant command contains the two channel identifiers.

14. A method according to claim 13, comprising the steps of receiving a channel release command and, responsive to the channel release command, ceasing transmission on one of the two channels when transmitting the same signal on the two channels and continuing transmission on the other of the two channels.

15. A method according to claim 13, comprising the step of receiving outbound signals from the central station over at least two channels and diversity combining the signals.

* * * * *